United States Patent
Yang

(10) Patent No.: US 7,589,494 B2
(45) Date of Patent: *Sep. 15, 2009

(54) SLIM BATTERY CHARGER

(75) Inventor: Fu-I Yang, Taoyuan (TW)

(73) Assignee: Samya Technology Co., Ltd., Taoyuan County (TW)

( * ) Notice: Subject to any disclaimer, the term of this patent is extended or adjusted under 35 U.S.C. 154(b) by 226 days.

This patent is subject to a terminal disclaimer.

(21) Appl. No.: 11/582,423

(22) Filed: Oct. 18, 2006

(65) Prior Publication Data

US 2008/0094028 A1 Apr. 24, 2008

(51) Int. Cl.
*H02J 7/00* (2006.01)

(52) U.S. Cl. ...................... 320/107; 439/500
(58) Field of Classification Search ............... 320/107
See application file for complete search history.

(56) References Cited

U.S. PATENT DOCUMENTS 3,579,075 A * 5/1971 Floyd ...................... 320/110
4,213,078 A * 7/1980 Ferrell et al. ............. 320/107
6,710,577 B1 * 3/2004 Shum ....................... 320/112
7,291,041 B1 * 11/2007 Yang ........................ 439/500
7,375,967 B2 * 5/2008 Huang et al. ............. 361/707

* cited by examiner

*Primary Examiner*—Edward Tso
*Assistant Examiner*—Samuel Berhanu
(74) *Attorney, Agent, or Firm*—Rosenberg, Klein & Lee

(57) ABSTRACT

A slim battery charger includes: a main charging body having a plug at the bottom end thereof; two charging grooves adapted to accommodate batteries, the charging grooves being disposed at the left and the right side of the main charging body; and a charging control circuit board having a front portion in contact with the plug via conducting spring strips for obtaining the AC current. The rear end of the charging control circuit board is electrically coupled to two first terminals. Contact surfaces of the first terminals are extended at the rear end of the left and the right charging groove. A second terminal with the telescopic and conducting function is disposed at an end opposite to each of the first terminals. The external end of the second terminals projects at the front end of the charging groove. In this way, the whole charger is smaller and thinner than a pack of cigarettes, thereby ensuring a convenient carrying. In addition, the charger permits a practical charging process for secondary batteries in different sizes.

6 Claims, 7 Drawing Sheets

SLIM BATTERY CHARGER

BACKGROUND OF THE INVENTION

1. Field of the Invention

The invention relates to a battery charger, and more particularly, to a portable and small charger having charging grooves at both sides thereof.

2. Description of the Related Art

With the popularity of portable electronic products like digital cameras, MP3, PDA, etc., the demand for secondary batteries is considerably raised. The problem of the electronic products using the secondary batteries lies in the inconvenience of access to the power source when the user going out for a business trip uses up the energy in the battery.

As shown in FIGS. 1A and 1B, a charger 10 includes a plug 11 at the bottom thereof. The plug 11 is adapted to insert into an AC mains. A charging electronic unit 12 is disposed within the charger 10. The charging electronic unit 12 includes a positive and a negative charging terminal 121, 122 projecting from the front and the rear wall of a charging groove 13 for charging the secondary batteries 20.

However, the conventional charger 10 is connected to an AC mains socket (not shown) with the aid of the plug 11. As a result, the charger 10 requires an AC-DC-converter 14 for providing the charging electronic unit 12 with the required DC voltage. In this way, the AC-DC-converter 14 will occupy most of the space at the front half part of the charger 10. Besides, the charging electronic unit 12 is fitted to the bottom of the charging groove 13 so that it is difficult to reduce the volume of the whole structure of the charger 10, thereby causing inconvenience in carrying it outdoors. Moreover, the plug 11 requires a corresponding AC mains socket to provide the charging power. It is also a problem that the AC mains socket is usually unavailable outdoors.

With the constant improvement of the portable electronic products, commodities like MP3 or PDA were made smaller and thinner. Moreover, many of them employ the secondary batteries (like 3/AA or 4/AAA) for providing the required power. Thus, the development of the charger for secondary batteries is toward the miniaturization and compactness. In addition, the charger that can charge different types of secondary batteries (like 3/AA or 4/AAA) can meet the requirements of the market. This is the main goal that the invention tries to achieve.

SUMMARY OF THE INVENTION

It is a primary object of the invention to provide a slim battery charger in which the opening of the charging groove is formed at both sides thereof, thereby ensuring an excellent room utilization. Meanwhile, the volume of the charger can be reduced to a thin elongated shape. Furthermore, the charger is suitable for charging different secondary batteries. Thus, the charger is easy to carry and meets the requirements in charging two presently popular secondary batteries.

It is another object of the invention to provide a slim battery charger that avoids a reverse charging process caused by a reverse placement of the secondary batteries in the charging groove, thereby achieving a better safety and prolonging the service life.

In order to achieve the above-mentioned objects, a slim battery charger in accordance with the invention includes:

a) a main charging body having a plug at the bottom thereof for connecting to a mains socket so as to obtain the alternating current (AC) from the mains socket;

b) two charging grooves adapted to accommodate batteries, the charging grooves being disposed at the left and right sides of the main charging body; and c) a charging control circuit board installed in a cavity in the middle of the main charging body, two conducting spring strips being coupled to the front end thereof for an electrical connection to the plug, two first terminals being electrically coupled to the rear end of the charging control circuit board, contact surfaces of the first terminals extending at the rear end of the left and the right charging groove, a second terminal being disposed at an end opposite to each of the first terminals, the second terminal being electrically coupled to the charging control circuit board, the second terminal being extendable and retractable such that the charging grooves can accommodate the second batteries with the type of 3/AA and 4/AAA for the charging process.

BRIEF DESCRIPTION OF THE FIGURES

The accomplishment of this and other objects of the invention will become apparent from the following descriptions and its accompanying figures of which.

DETAILED DESCRIPTION OF THE PREFERRED EMBODIMENT

Figure 1A:
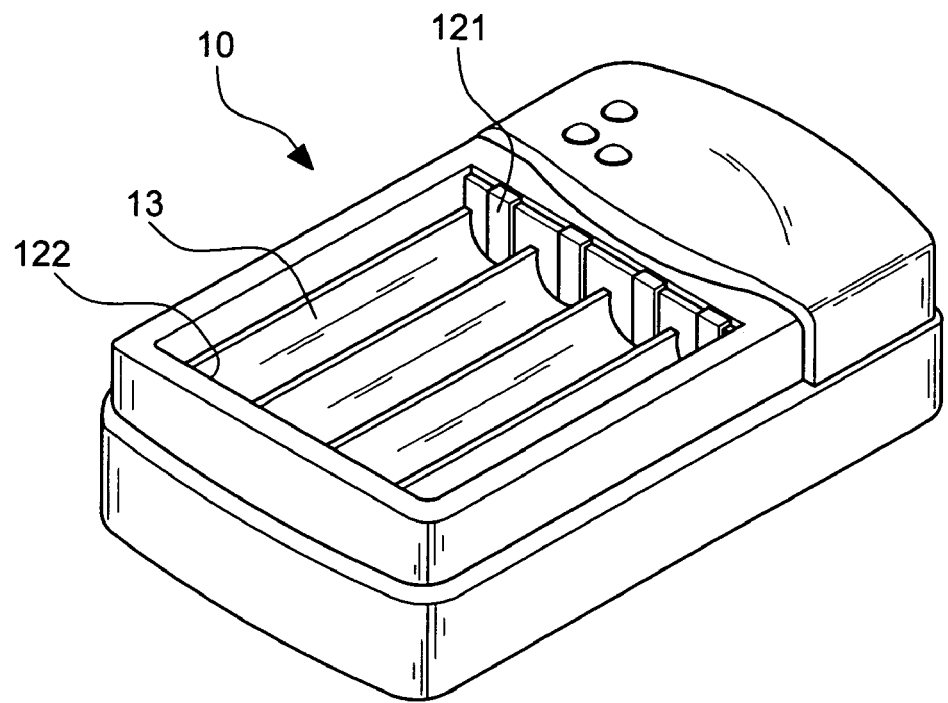
FIG. 1A is a perspective view of a charger of the prior art.
Figure 1B:
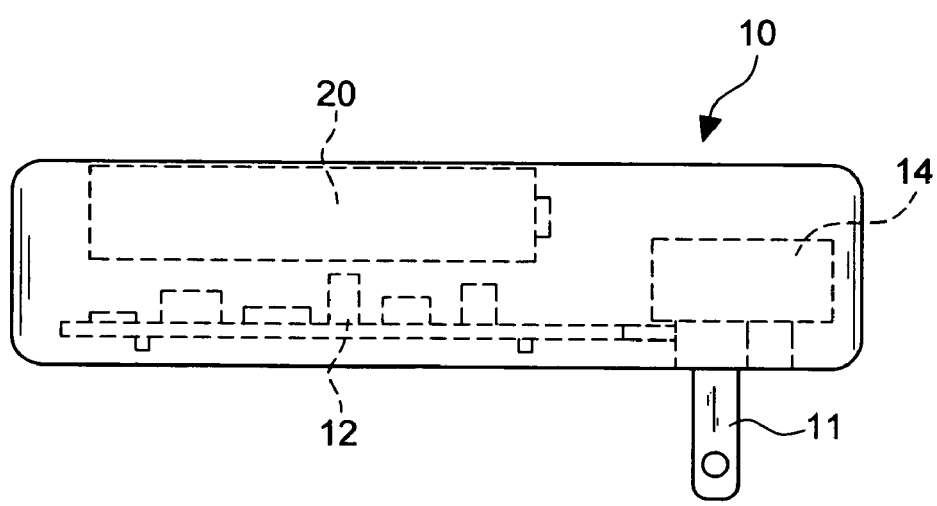
FIG. 1B is a side view of a charger of the prior art.
Figure 2:
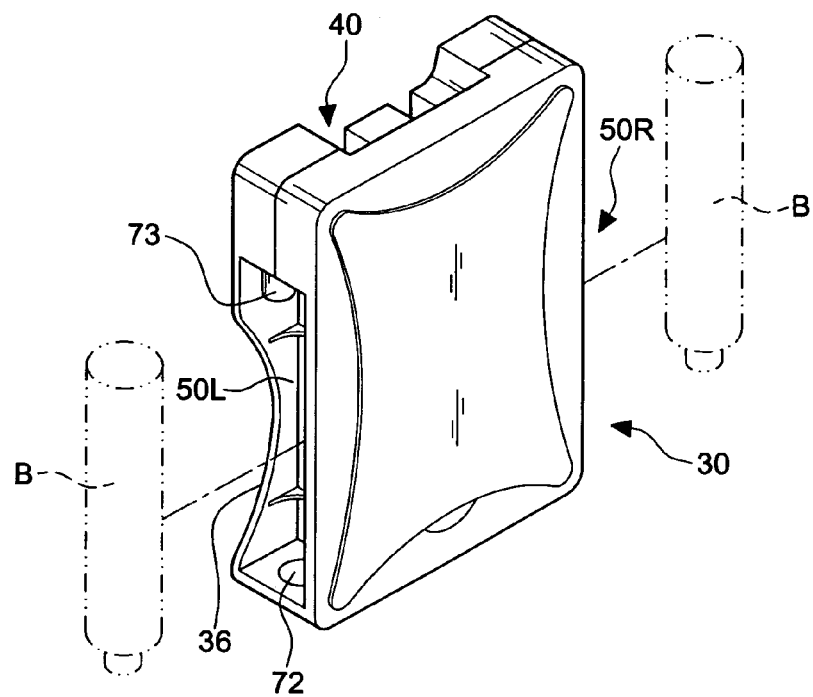
FIG. 2 is a front side perspective view of the of a preferred embodiment of the invention.
Figure 3:
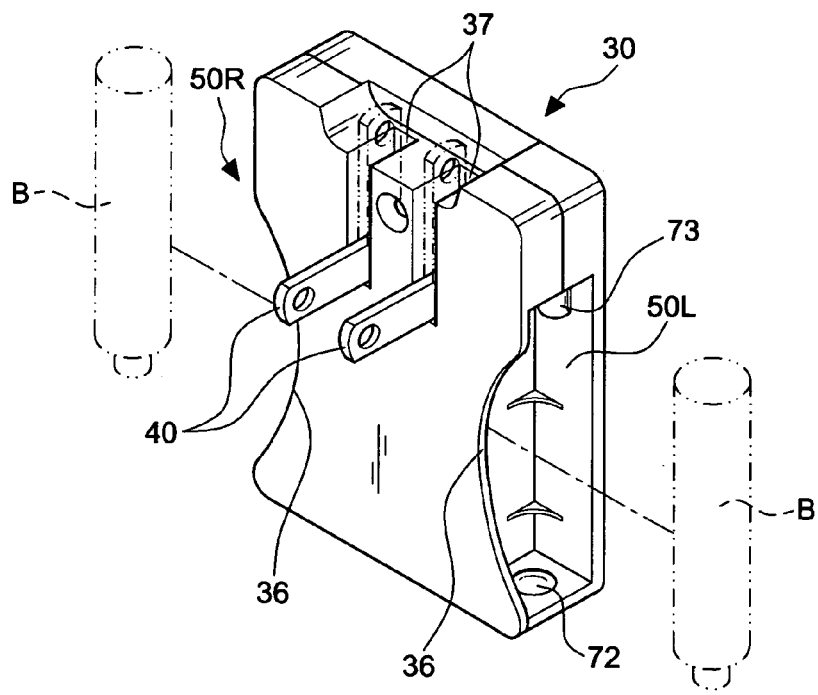
FIG. 3 is a perspective view of the rear side of the preferred embodiment of the invention.
Figure 4:
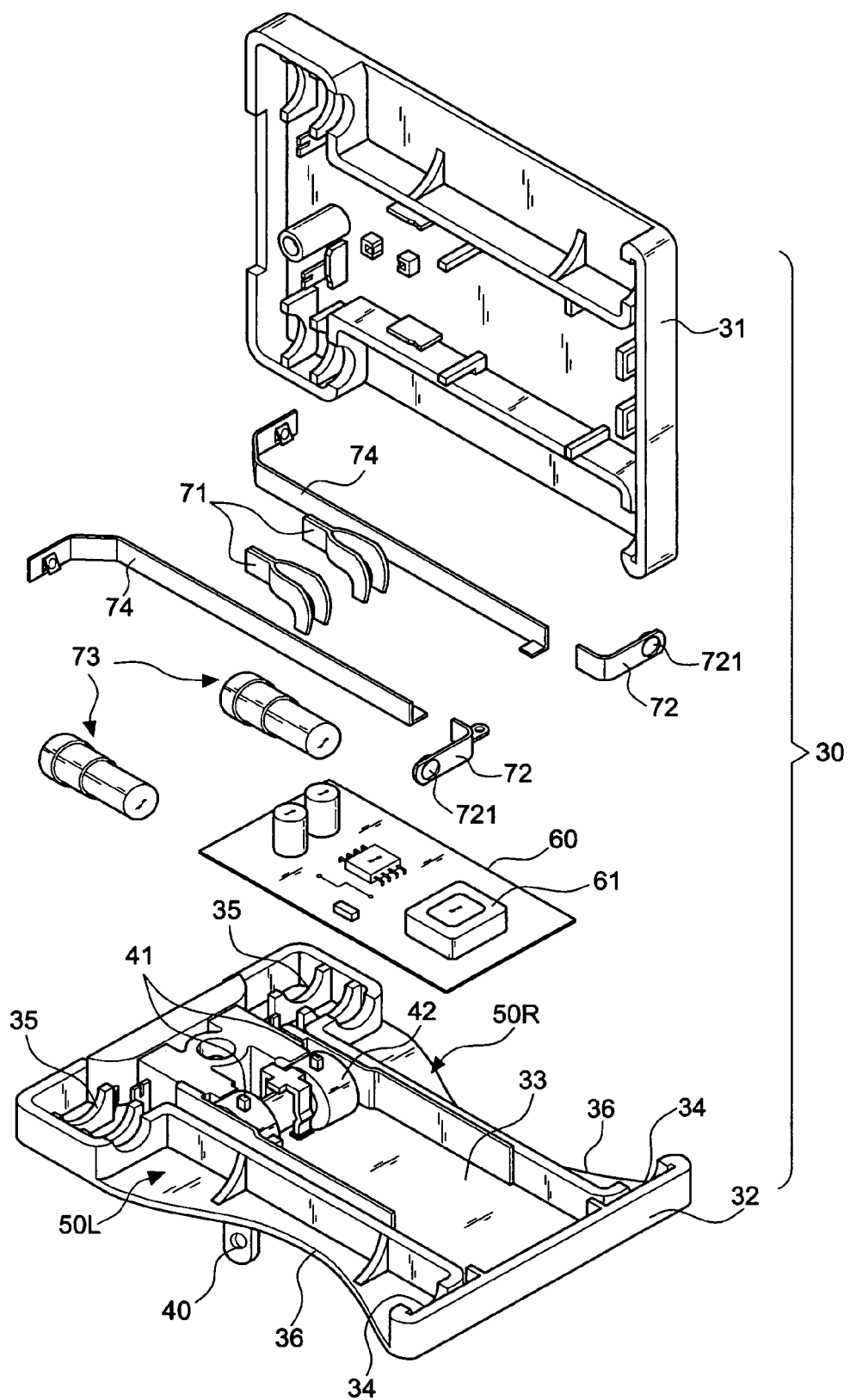
FIG. 4 is an exploded perspective view of the preferred embodiment of the invention.
Figure 5:
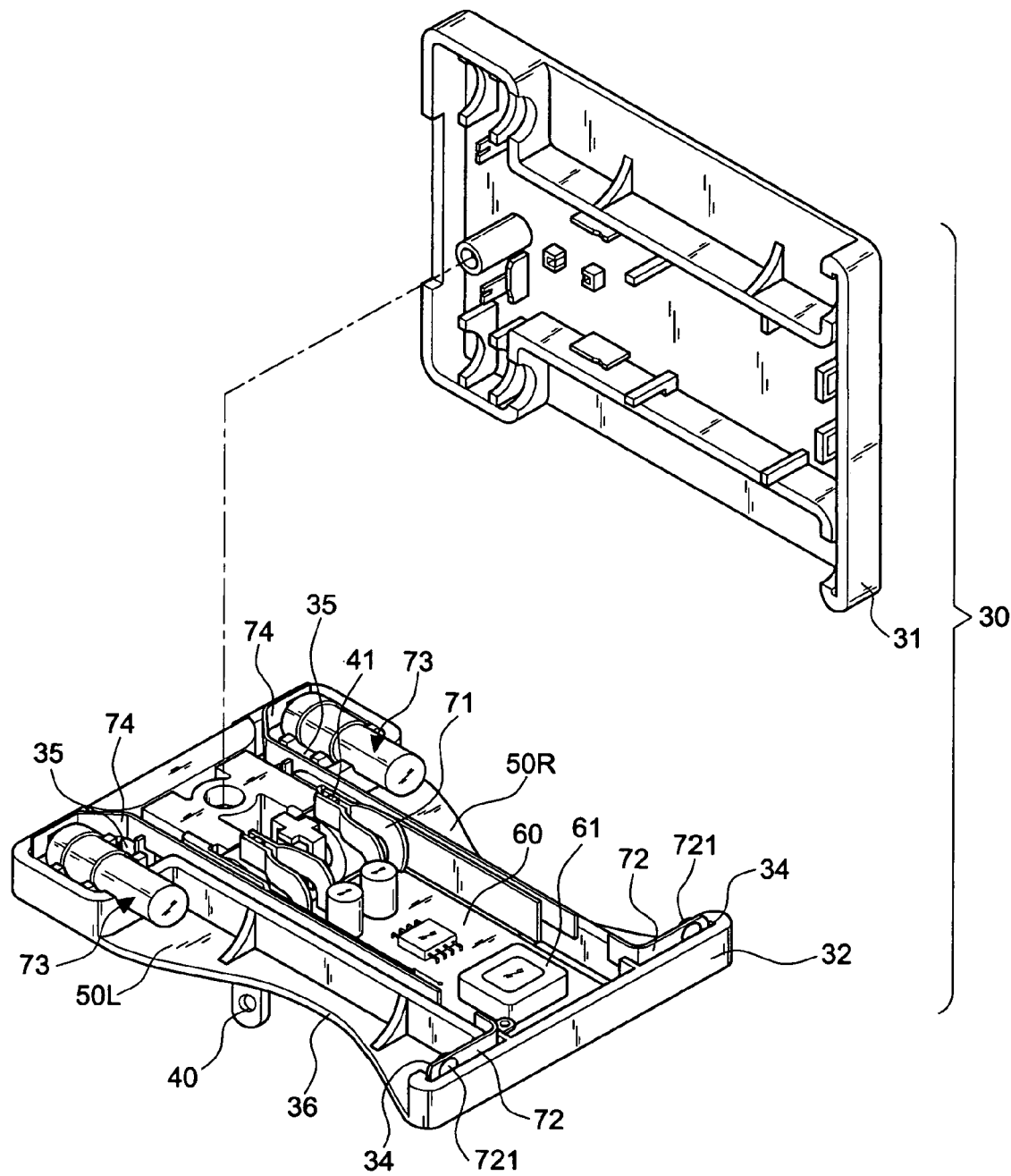
FIG. 5 is a perspective view of the preferred embodiment of the invention, showing that an upper and a lower housing are separated.

First of all, referring to FIGS. 3 through 5, a preferred embodiment of the invention includes a main charging body 30. The main charging body 30 has a plug 40 for connecting to a mains socket (not shown) so as to obtain the alternating current (AC) from the mains socket. The plug 40 is swivelable so as to be received in grooves 37 at the bottom side of the main charging body 30. The main charging body 30 consists of a top and a bottom housing 31, 32 between which a cavity 33 is formed.

The main charging body 30 has a left and a right charging groove 50L, 50R at both sides thereof for the insertion of two secondary batteries B for the charging purpose. Moreover, an arched groove 36 is formed at the bottom side of the left and the right charging groove 50L, 50R so as to facilitate the placement or removal of the secondary batteries B. However, the configuration is not restricted thereto.

A charging control circuit board 60 is installed in the cavity 33 in the middle of the main charging body 30. The charging control circuit board 60 includes at least one AC-to-DC conversion circuit 61 for changing the alternating current (AC) into the direct current (DC) so as to provide the required charging current in the left and the right charging groove 50L, 50R. The charging control loop is not the object of the invention so that no further descriptions thereto are given hereinafter.

Figure 6:
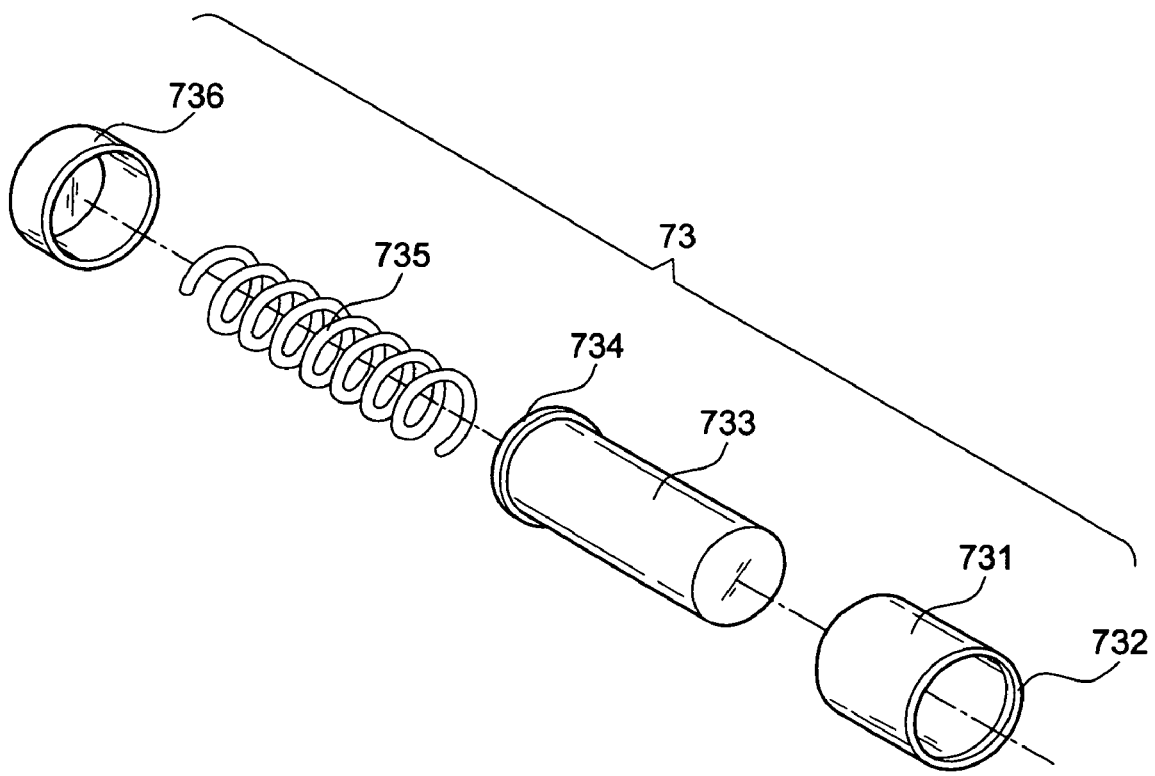
FIG. 6 is an exploded perspective view of a second terminal in accordance with the preferred embodiment of the invention.
Figure 7:
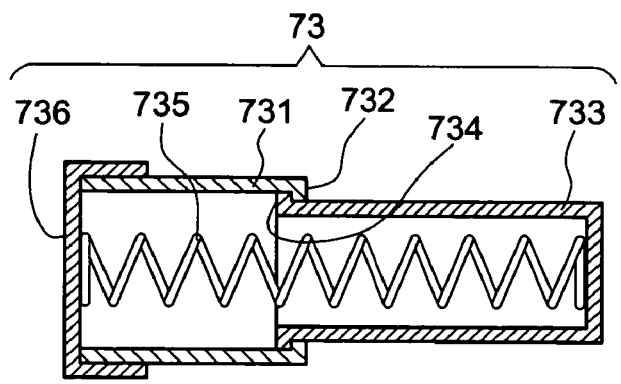
FIG. 7 is an axially sectional view of the second terminal in accordance with the preferred embodiment of the invention.

The main structure of the invention lies in the design of the left and the right charging groove 50L, 50R. Unlike the conventional structure in which both charging grooves are formed at the top of the charging electronic unit 12, the left and the right charging groove 50L, 50R are positioned at both side of the charging control circuit board 60 with the openings directed to the left and the right side, respectively. In this way, the thickness of the main charging body 30 can be reduced, thereby achieving the slim and compact configuration thereof. In spite of the space restriction of the left and the right charging groove 50L, 50R, the secondary batteries in form of 3/AA and 4/AAA can be placed thereinto for the charging process. In order to achieve the above-mentioned objects, two conducting spring strips 71 at the front end thereof are electrically coupled to projections 41 extending from the plug 40 to the inside of the main charging body 30, respectively. In this way, the power can be delivered to the charging control circuit board 60. Moreover, two first terminals 72 are electrically coupled to the distal end of the charging control circuit board 60. Meanwhile, contact surfaces 721 of the first terminals 72 are extended to recesses 34 at the rear end of the left and the right charging groove 50L, 50R in such a way that an electrical connection is established when the batteries are inserted in place. Furthermore, two telescopic and conducting second terminals 73 opposing to the first terminals 72 are engaged into locking grooves 35 within the main charging body 30. The second terminals 73 are electrically coupled to the charging control circuit board 60. As shown in FIGS. 6 and 7, each of the second terminals 73 includes an external sleeve 731, an internal sleeve 733, a spring 735 received within the internal sleeve 733, and a cap 736 fixed at the front end of the external sleeve 731. The external sleeve 731 has an opening at the front and the rear end thereof. A locking portion 732 is extended inwardly at the rear end of the external sleeve 731. The internal sleeve 733 is formed in the shape of a hollow body with an opening at the front end thereof. The internal sleeve 733 is movably disposed within the external sleeve 731. The front end of the internal sleeve 733 is provided with an outward flange 734 corresponding to the locking portion 732 in such a way that the rear end of the internal sleeve 733 is extended to the front end of the left and the right charging groove 50L, 50R.

Figure 8:
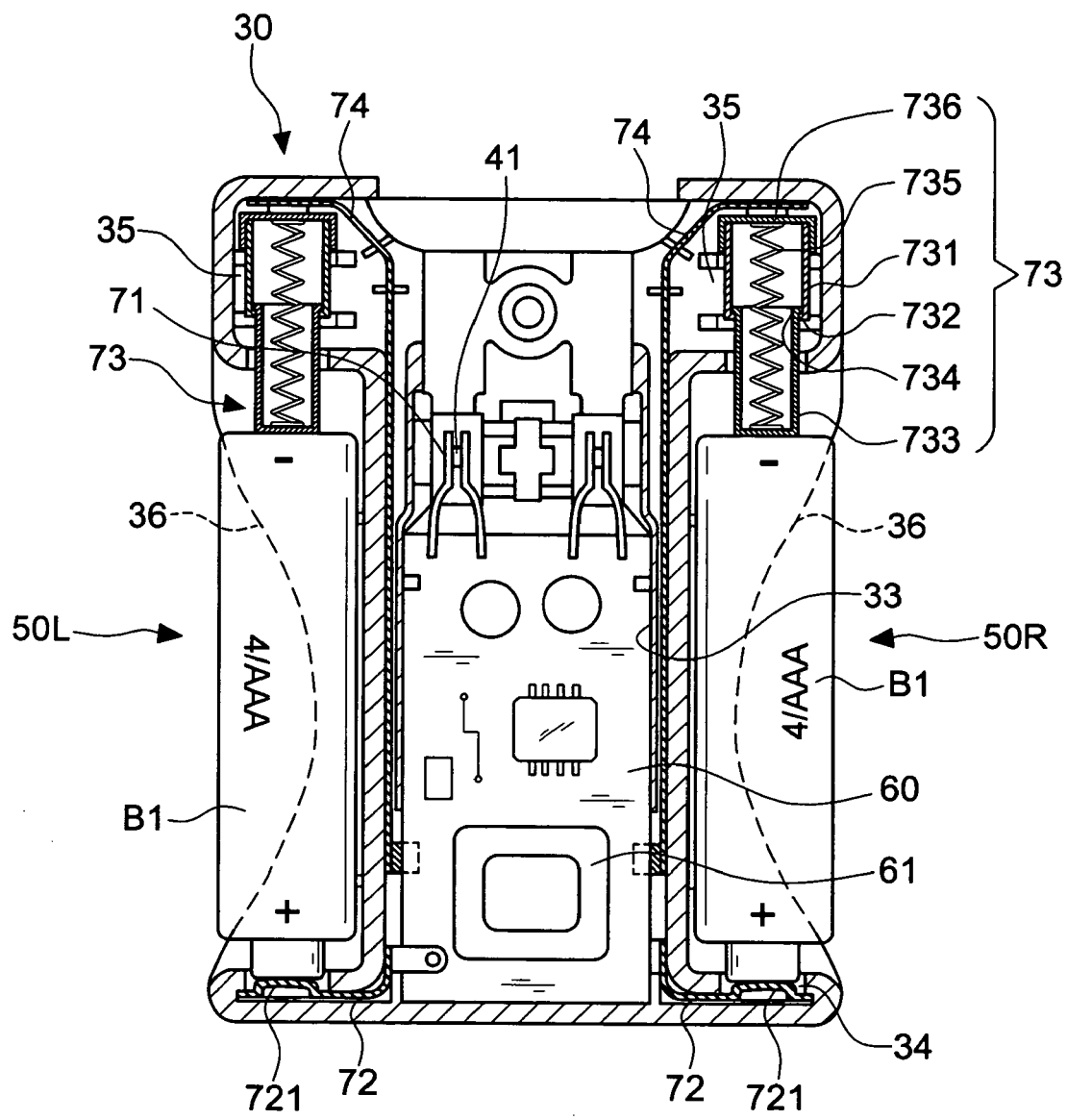
FIG. 8 is a schematic drawing of the invention in charging batteries with the type of 4/AAA.

Based on the above-mentioned structure, the second terminal 73 has the telescopic function. Meanwhile, the front end thereof is coupled to an elongated conducting piece 74 for an electric connection. The elongated conducting piece 74 may be formed as a metal spring strip, wire, and the like. The rear end of the second terminals 73 is extended into the front portion of the left and a right charging groove 50L, 50R, respectively. As shown in FIG. 8, two secondary batteries B1 in 4/AAA type are placed into the charging grooves. The internal sleeve 733 of the second terminal 73 is pushed by the internal spring 735 in such a way that the rear end of the second terminal 73 is in contact with the negative terminal of the secondary batteries B1. Meanwhile, the positive terminals of the secondary batteries B1 are forced to be in contact with the contact surface 721 of the first terminals 72, thereby creating a charging loop. It is to note that the contact surface 721 of the first terminals 72 is disposed within the recess 34 at the rear end of the left and a right charging groove 50L, 50R in such a way that a successful electric connection is established only between the first terminals 72 and the positive terminals of the secondary batteries B1. A charging loop won't be established when the batteries are placed in a reverse direction into the left and a right charging groove 50L, 50R. The reason lies in that the negative terminal is formed in a flat surface and can't therefore be extended into the recess 34. Thus, the invention can avoid a reverse charging process caused by a reverse placement of the secondary batteries in the charging groove, thereby achieving a better safety and prolonging the service life.

Figure 9:
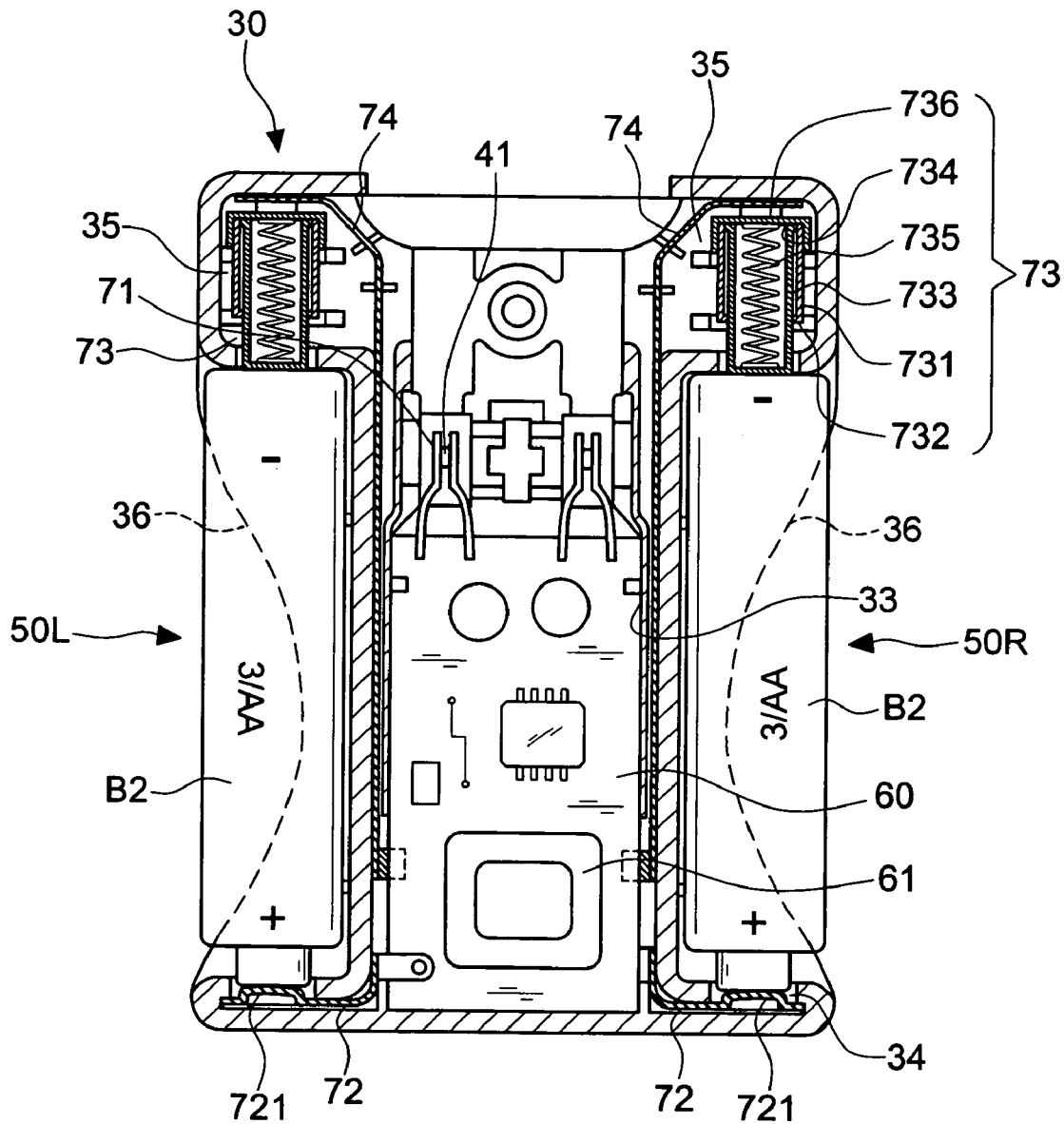
FIG. 9 is a schematic drawing of the invention in charging batteries with the type of 3/AA.

As shown in FIG. 9, the secondary batteries B2 have the type No. 3/AA and are so-called No. 3 battery. The No. 3 batteries are dimensioned larger than the No. 4 batteries. Therefore, the internal sleeve 733 of the second terminal 73 is retracted in such a way that the rear end of the internal sleeve 733 still lies against the negative terminal of the secondary batteries B2. Accordingly, the invention is suitable for charging the secondary batteries with the type of 3/AA and 4/AAA.

Referring now to FIGS. 7 through 9, the second terminal 73 always ensures a perfect electric contact no matter if the internal sleeve 733 is extended, as shown in FIG. 8 or retracted, as shown in FIG. 9. In other words, the flange 734 is always in electric contact of the internal wall of the external sleeve 731, thereby ensuring an electric connection to the cap 736. In addition, the internal sleeve 733 is always in electric contact to the cap 726 by means of the spring 735 within the internal sleeve 733. This configuration with double electric contact can avoid the problem of bad contact caused by the extending or retracting action of the second terminal 73. As a result, the second terminal 73 permits a perfect electric contact and ensures a reliable charging process no matter if the second terminal 73 is extended or retracted.

Based on the above-mentioned configuration having the charging grooves disposed at both sides of the charging control circuit board 60 and the openings of the charging grooves directed to both sides of the charging control circuit board 60, an excellent room utilization can be ensured. Accordingly, the volume of the charger can be reduced to a thin elongated shape with the dimensions of less than 2 cm thick, 5.2 cm wide, and 7 cm long that is smaller than a pack of cigarettes. Thus, the charger in accordance with the invention is easy to carry and practical in connection to the mains sockets nearby. Furthermore, the charger in accordance with the invention is suitable for charging different secondary batteries (such as 4/AAA and 3/AA batteries), depending on different requirements of users.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A slim battery charger, comprising:
 a) a main charging body having a swivelable plug at a bottom thereof for connecting to a mains socket to obtain alternating current (AC) from the mains socket;
 b) two charging grooves adapted to accommodate batteries, the charging grooves being disposed at left and right sides of the main charging body; and
 c) a charging control circuit board installed in a cavity in a central portion of the main charging body, two conducting spring strips being coupled to a front end thereof for electrically connecting to the plug, two first terminals being electrically coupled to a rear end of the charging control circuit board, contact surfaces of the first terminals respectively extend into recesses at a rear end of the left and the right charging groove for receiving a positive contact of batteries to be charged, a second terminal being disposed at an opposite end of each respective charging groove opposite to a corresponding one of the first terminals, the second terminal being electrically coupled to the charging control circuit board, each second terminal including an external sleeve engaged into a corresponding locking groove disposed at the opposite end of the respective charging groove, the external sleeve having a closed proximal end, an open distal end and a through bore extending therebetween, each second terminal further including an internal sleeve telescopically engaged within the through bore of the external sleeve and biased by a spring to extend outwardly from the distal end of the external sleeve to be reversibly extendable and retractable for abutting a negative contact of a corresponding battery to be charged such that the charging grooves each accommodate a 3/AA or a 4/AAA secondary battery for the charging process wherein the external sleeve of the second terminal includes, a locking portion extending inwardly adjacent the open distal end thereof; internal sleeve being formed as a hollow body having an opening at the front end thereof, the internal sleeve having a flange extending outwardly and corresponding to the locking portion, the rear end of the internal sleeve being extended to the front end of the charging groves, the internal sleeve having; the spring installed therein and extending to a cap forming a closure of the proximal end of the external sleeve.

2. The slim battery charger as recited in claim 1 wherein the charging control circuit board includes at least one AC-to-DC conversion circuit for changing the alternating current (AC) obtained via the plug into a direct current (DC) so as to provide the required charging current in the charging grooves.

3. The slim battery charger as recited in claim 1 wherein the main charging body consists of an upper and a lower housing.

4. The slim battery charger as recited in claim 1 wherein the first terminal is directly and electrically connected to the charging control circuit board while the second terminal is electrically coupled to the charging control circuit board via an elongated conducting piece.

5. A slim battery charger, comprising:
a) a main charging body having a plug at a bottom thereof for connecting to a mains socket for obtaining an alternating current (AC) from the mains socket;
b) two charging grooves adapted to accommodate batteries, the charging grooves being respectively disposed at opposing left and right sides of the main charging body; and
c) a charging control circuit board installed in a cavity in a central portion of the main charging body, two conducting spring strips being coupled to a front end thereof for an electrical connection to the plug, two first terminals being electrically coupled to a rear end of the charging control circuit board, contact surfaces of the first terminals respectively extending at a rear end of the left and the right charging grooves, a second terminal being disposed at an opposite end of each respective charging groove opposite to a respective one of the first terminals, the second terminal being electrically coupled to the charging control circuit board, the second terminal including:
  i) an external sleeve having an opening at a front and a rear end thereof, a locking portion extending inwardly at the rear end of the external sleeve;
  ii) an internal sleeve formed as a hollow body having an opening at a front end thereof, the internal sleeve being telescopically displaceably disposed within the external sleeve, the internal sleeve having a flange extending outwardly and corresponding to the locking portion, a rear end of the internal sleeve being extended into a corresponding one of charging grooves;
  iii) a spring installed within the internal sleeve for biasing the rear end of the internal sleeve into the corresponding charging groove; and
  iv) a cap fixed at the front end of the external sleeve.

6. The slim battery charger as recited in claim 5 wherein an arched groove is formed at a bottom side of the charging groove.

* * * * *